P. O. SAMPSON.
TIRE OPENING AND HOLDING TOOL.
APPLICATION FILED AUG. 22, 1919.
1,356,504. Patented Oct. 19, 1920.
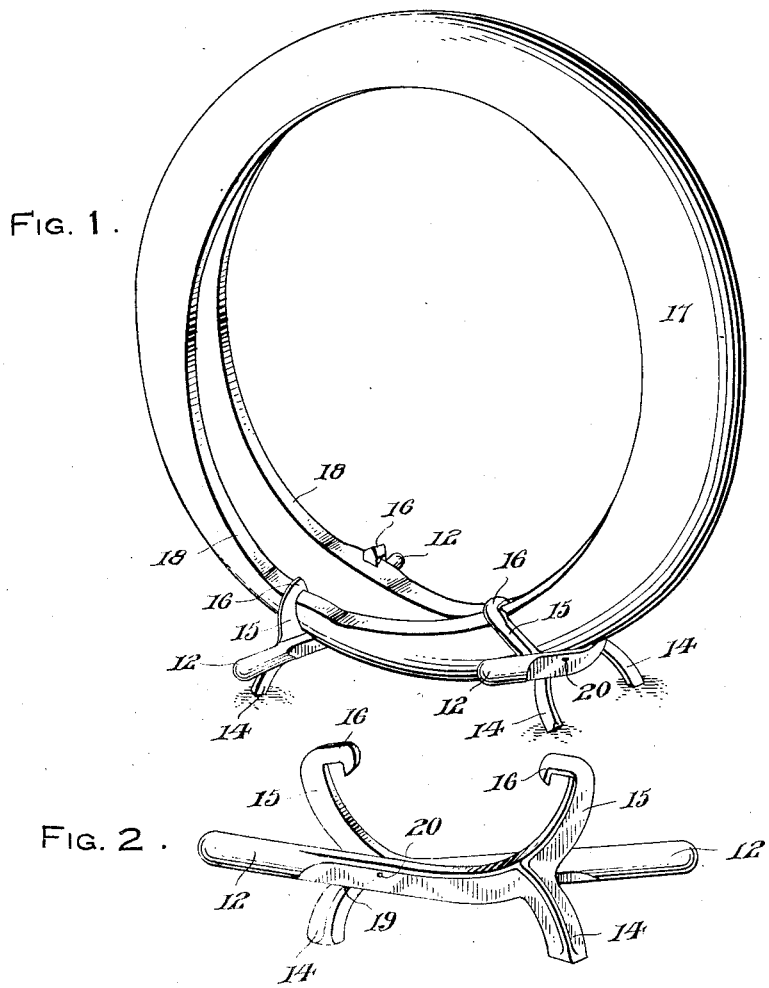
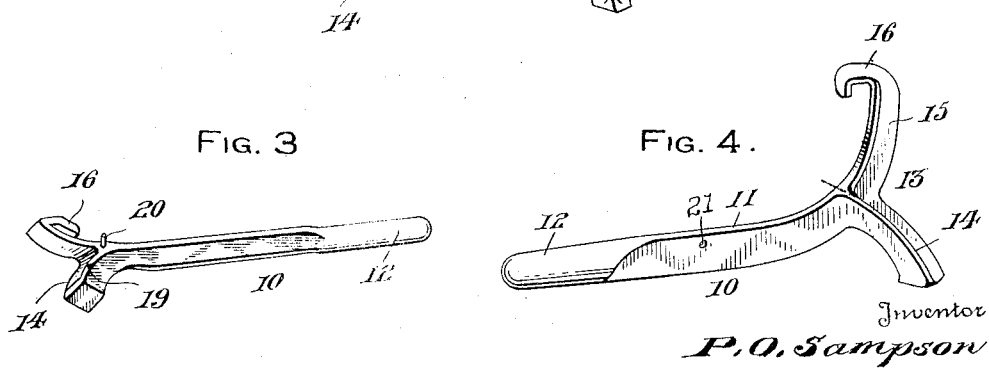

UNITED STATES PATENT OFFICE.

PHILLIP O. SAMPSON, OF HORNELL, NEW YORK, ASSIGNOR OF ONE-HALF TO JOHN D. WHEELER, OF HORNELL, NEW YORK.

TIRE OPENING AND HOLDING TOOL.

1,356,504.  Specification of Letters Patent.  Patented Oct. 19, 1920.

Application filed August 22, 1919. Serial No. 319,193.

*To all whom it may concern:*

Be it known that I, PHILLIP O. SAMPSON, a citizen of the United States of America, residing at Hornell, in the county of Steuben and State of New York, have invented certain new and useful Improvements in Tire Opening and Holding Tools, of which the following is a specification.

The primary object of the invention is to provide a simple tool readily applied to a tire shoe or casing for opening the same and holding it in open position for purposes of examination or for work, such as repairing the fabric or lining therein.

A further object of the invention is to hold a tire in open position without the positioning of obstructions within the tire which would interfere with the making of repairs therein and whereby free access to the injured interior of the tire is made possible for the easy repair thereof.

A still further object of the invention is the provision of an opening tool readily maintained in position by the weight of the tire positioned therein with the tire arranged upright convenient to the operator for making repairs within the tire, the invention being serviceable for automobile owners generally as well as tire repairing establishments.

With these general objects in view, my invention consists of a tool that is easy and inexpensive to manufacture consisting of a plurality of identical members as hereinafter fully described in connection with the accompanying drawing and then claimed.

In the drawing forming a part of this application and in which like reference characters designate corresponding parts throughout the several views, Figure 1 is a perspective view of a tire shoe held upright in open position by my invention.

Fig. 2 is a perspective view of one set of tools assembled.

Fig. 3 is a perspective view of one of the interchangeable members of the set, and Fig. 4 is a perspective view thereof turned in an opposite position.

Referring more in detail to the drawing, my invention broadly consists of a substantially T-shaped tool or iron 10 having a lever portion 11 terminating in a handle 12 at one end of the tool and in a cross head 13 at the opposite end thereof. This cross head 13 comprises oppositely projecting curved extensions 14 and 15, 14 serving as a foot or leg while the extension 15 has a hook 16 at its free end serving as a holding arm.

Two of the irons 10 constitute a set and one or two sets may be employed for a tire shoe such as 17 illustrated in its open position in Fig. 1 of the drawing. The irons 10 are mounted upon the shoe 17 by positioning the hooks 16 thereof over the opposite edges or beads 18 of the tire with the levers of the irons 10 projecting transversely in opposite directions beneath the tire in flat engagement with each other. With the irons 10 positioned in this manner, it will be evident that lifting up on the handles 12 will tend to open the tire 17 by spreading the bead portions 18 thereof apart.

A hollow notch forms a slight shoulder 19 in the inner side of each leg 14 and is adapted to receive the adjacent part of the coöperating tool lever thereover, locking the pair of irons 10 together, holding the tire open and forming two legs. For further pivoting two of the irons 10 together, a pin 20 may project from the crotch portion of the iron for reception within a perforation 21 through the lever 11 of the companion iron and whereby two irons may be hung together when locked upon a tire.

It will be evident that two pairs of irons 10 may be placed upon the tire 17 at suitable distances on opposite sides of the point to be repaired, thereby holding the tire open without any obstruction whatever within the tire and permitting the insertion of a patch or fabric while the tire is not deformed and the patch will retain its shape without buckling when the irons are released for vulcanizing the repaired portion.

The advantages and operation of my invention will be apparent from this detailed description thereof, the tire 17 being easily pried open with but little effort leaving no obstruction in the inside of the tire to interfere with examination or repair, while the tire is held in an upright position for moving about as may be convenient and the irons readily adjust themselves to tires of different sizes.

One iron may be employed for stretching one side of a tire as needed.

What I claim as new is

1. A tire tool adapted for use in pairs comprising a lever having a narrowed edge portion at its lower side when in position for use, a handle at one end of the lever, a head at the opposite end of the lever comprising oppositely projecting curved leg and arm portions adapted for positioning at opposite sides of a tire when two of the irons are assembled in tire supporting position with the levers beneath the tire and the leg portions in their supporting arrangement, the said leg portions having shoulders upon their inner sides adapted for receiving the narrowed edge portion of the adjacent co-operating lever thereover when in use.

2. A pair of tire irons each having a lever adapted for transverse arrangement beneath the tire when holding the tire open, a supporting leg projecting in one direction from one end of each lever at opposite sides of the tire, an arm at the opposite side of the lever from the leg thereof having a hook at its free end for engaging over the adjacent edge of a tire when supported upon the pair of irons and stop means upon each leg for the adjacent lever when the device is assembled.

3. A pair of interchangeable tire irons each comprising a lever with a crosshead at one end, the said crossheads being adapted for opposite positioning with the levers substantially in flat engagement when the irons are in use with a tire upon said levers between the crossheads, inwardly projecting hooks upon the crossheads adapted for overlying the opposite edge portions of a tire when mounted upon the irons and holding connections for said irons when in tire supporting arrangement.

In testimony whereof I affix my signature.

PHILLIP O. SAMPSON.